US012669094B2

(12) United States Patent
Ikesue et al.

(10) Patent No.: US 12,669,094 B2
(45) Date of Patent: Jun. 30, 2026

(54) CONTROL DEVICE FOR INTERNAL COMBUSTION ENGINE

(71) Applicant: TOYOTA JIDOSHA KABUSHIKI KAISHA, Toyota (JP)

(72) Inventors: Shuya Ikesue, Toyota (JP); Hibiki Ueura, Toyota (JP); Kazuhiro Uehara, Kariya (JP); Hiroyuki Shirokisawa, Toyota (JP); Tomohiro Saito, Okazaki (JP); Ryoma Yanagida, Chiryu (JP); Hajime Osuka, Nukata-gun (JP); Daisuke Murakami, Toyota (JP); Hayato Tsutsui, Toyota (JP); Toshinobu Mizuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/090,832

(22) Filed: Mar. 26, 2025

(65) Prior Publication Data

US 2026/0015982 A1 Jan. 15, 2026

(30) Foreign Application Priority Data

Jul. 12, 2024 (JP) ................................ 2024-112182

(51) Int. Cl.

| | |
|---|---|
| ***F02D 41/00*** | (2006.01) |
| ***F02D 31/00*** | (2006.01) |
| ***F02D 41/04*** | (2006.01) |
| ***F02D 41/12*** | (2006.01) |
| ***F02D 41/14*** | (2006.01) |
| *F02D 9/02* | (2006.01) |

(52) U.S. Cl.

CPC ....... *F02D 31/007* (2013.01); *F02D 41/0027* (2013.01); *F02D 41/047* (2013.01); *F02D 41/126* (2013.01); *F02D 41/1475* (2013.01); *F02D 2009/0245* (2013.01); *F02D 2200/024* (2013.01)

(58) Field of Classification Search

CPC .. F02D 31/007; F02D 41/0027; F02D 41/047; F02D 41/126; F02D 2009/0245

USPC .......................................................... 701/112

See application file for complete search history.

(56) References Cited

U.S. PATENT DOCUMENTS

| | | | | |
|---|---|---|---|---|
| 6,338,331 B1 * | 1/2002 | Watanabe | F02D 41/1454 | 123/399 |
| 2006/0075990 A1 * | 4/2006 | Muto | F01L 13/0063 | 123/348 |

FOREIGN PATENT DOCUMENTS

| | | |
|---|---|---|
| JP | 2007-064032 A | 3/2007 |

* cited by examiner

*Primary Examiner* — Erick R Solis

(74) *Attorney, Agent, or Firm* — SoraIP, Inc.

(57) ABSTRACT

The control device of the internal combustion engine calculates the target rotational speed so that the target rotational speed increases as the engine coolant temperature decreases when the shutdown request of the internal combustion engine is detected. Next, racing is executed by the fuel injection is continuously executed until the engine rotational speed reaches the target rotational speed in a state where the throttle valve is fully opened. Further, the control device stops the fuel injection in a state where the throttle valve is fully opened when the engine rotational speed reaches the target rotational speed. When the output shaft of the internal combustion engine is rotated by inertia to scavenge the inside of the cylinder of the internal combustion engine, (Continued)

moisture generated on the inner wall of the cylinder can be blown off, so that occurrence of misfire can be suppressed.

5 Claims, 4 Drawing Sheets

TARGET ROTATIONAL SPEED [rpm]

AMOUNT OF FUEL INJECTION [mg/st]

CONTROL DEVICE FOR INTERNAL COMBUSTION ENGINE

CROSS-REFERENCE TO RELATED APPLICATION

This application claims priority to Japanese Patent Application No. 2024-112182 filed on Jul. 12, 2024, incorporated herein by reference in its entirety.

BACKGROUND

1. Technical Field

The present disclosure relates to a control device for an internal combustion engine.

2. Description of Related Art

Japanese Unexamined Patent Application Publication No. 2007-64032 (JP 2007-64032 A) describes a control device that promotes scavenging at the time of shutdown of an internal combustion engine, thereby reducing adhesion of deposits to fuel injection valves and ignition plugs. The control device increases crank revolutions of the internal combustion engine at the time of shutdown of the internal combustion engine. The control device increases a throttle valve opening degree after stopping fuel injection, in order to increase the amount of fresh air that is introduced into a combustion chamber. Thus, scavenging can be promoted to reduce adhesion of deposits to the fuel injection valves and the ignition plugs.

SUMMARY

In the case of an internal combustion engine using hydrogen gas as a fuel, water is generated by combustion of hydrogen gas, and accordingly moisture is contained in combusted gasses. When the combusted gasses containing moisture come into contact with inner walls of cylinders, the moisture that is contained in the combusted gasses is cooled, and condensation occurs. When moisture that is generated in the cylinders adheres to the ignition plugs, misfiring may occur.

A control device for an internal combustion engine that solves the above problem is a control device for an internal combustion engine using hydrogen gas as a fuel for lean combustion, in which a lean air-fuel mixture of which an air-fuel ratio is greater than a stoichiometric air-fuel ratio is combusted.

The control device executes, when a shutdown request is detected,

- calculating a target rotational speed based on engine coolant temperature, such that the target rotational speed is greater when the engine coolant temperature is low than when the engine coolant temperature is high,
- executing racing, in which fuel injection is continued in a state in which a throttle valve is fully opened and an engine rotational speed is raised until the engine rotational speed reaches the target rotational speed, and
- scavenging inside of a cylinder of the internal combustion engine, by allowing an output shaft of the internal combustion engine to rotate under inertia in a state in which the fuel injection is stopped and the throttle valve is fully opened, when the engine rotational speed reaches the target rotational speed.

The control device for the internal combustion engine can suppress misfiring from occurring by blowing away moisture that is generated on the inner walls of the cylinders.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a control device for an internal combustion engine will be described with reference to FIGS. 1 to 5.

Configuration of the Internal Combustion Engine 10

Figure 1:
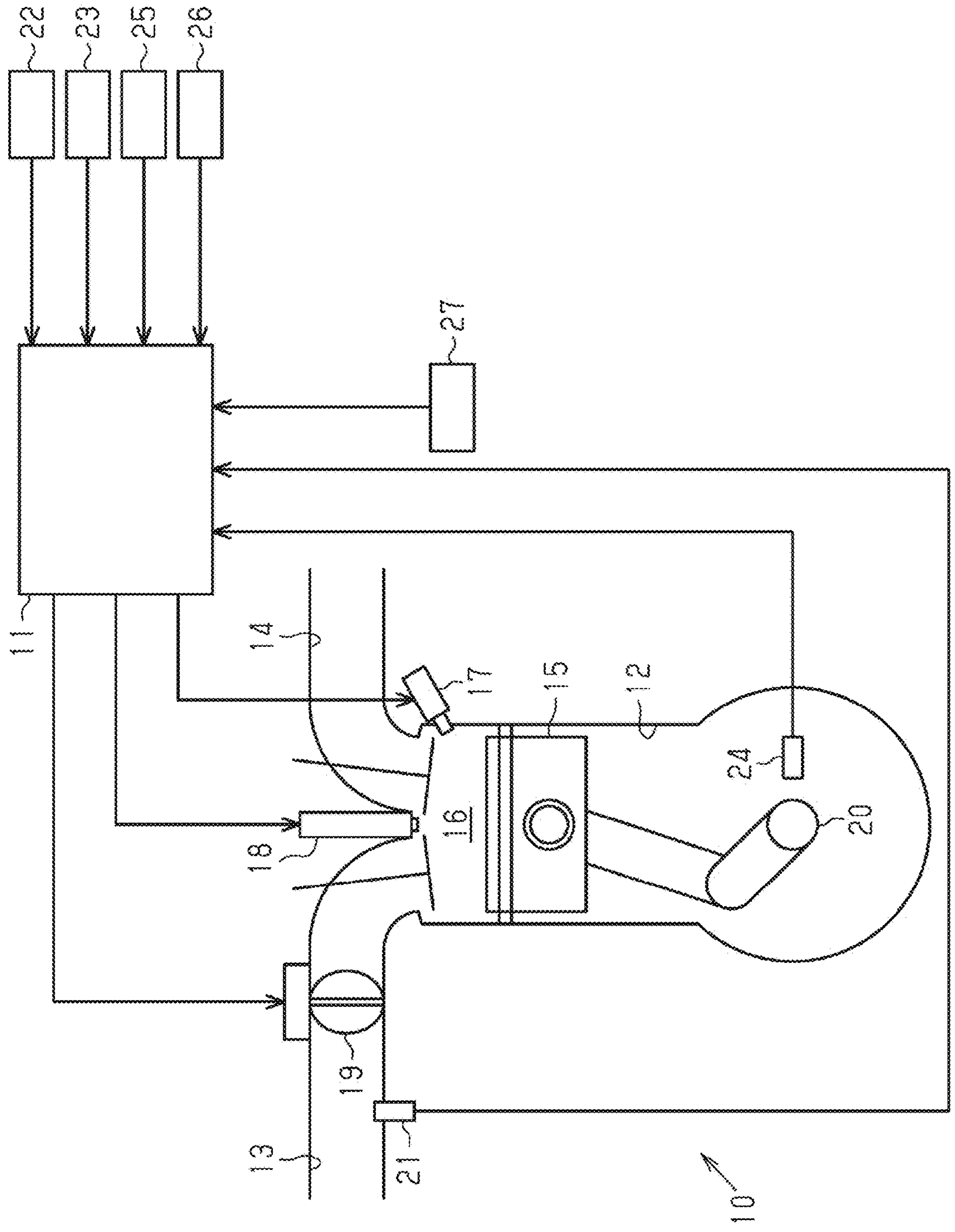
FIG. 1 is a diagram illustrating a configuration of a control device for an internal combustion engine and an internal combustion engine according to an embodiment.

First, a configuration of the internal combustion engine 10 to be controlled by the control device 11 of the internal combustion engine 10 will be described with reference to FIG. 1. The internal combustion engine 10 includes a plurality of cylinders 12. FIG. 1 shows only one of the plurality of cylinders 12. In each of the plurality of cylinders 12, combustion of the air-fuel mixture is performed. Further, the internal combustion engine 10 includes an intake passage 13, which is an introduction passage of fresh air into the plurality of cylinders 12, and an exhaust passage 14, which is an exhaust passage of exhaust gas from the cylinders 12. Further, a piston 15 is provided in the cylinder 12, and a combustion chamber 16 is partitioned and formed above the piston 15. The combustion chamber 16 is provided with an in-cylinder injector 17 for injecting fuel to form an air-fuel mixture. Further, the combustion chamber 16 is provided with an ignition device 18 that ignites the air-fuel mixture in the combustion chamber 16 by spark discharge. A throttle valve 19 is installed in the intake passage 13. By changing the opening degree of the throttle valve 19, it is possible to adjust the amount of fresh air introduced into the combustion chamber 16. The internal combustion engine 10 generates a driving force of the vehicle by rotating the crankshaft 20, which is an output shaft of the internal combustion engine 10, by the combustion of the air-fuel mixture in the combustion chamber 16.

The internal combustion engine 10 is controlled by a control device 11. The control device 11 receives the detection results of various sensors for detecting the operating state of the internal combustion engine 10. The various sensors include an air flow meter 21, a vehicle speed sensor 22, an accelerator position sensor 23, a crank angle sensor 24, a coolant temperature sensor 25, and an oil temperature sensor 26.

The air flow meter 21 is a sensor that detects an intake air amount that is a flow rate of the intake air flowing through the intake passage 13. The vehicle speed sensor 22 is a sensor that detects the speed of the vehicle. The accelerator position sensor 23 is a sensor that detects a depression amount of the accelerator pedal. The crank angle sensor 24 is a sensor that detects a crank angle that is a rotation angle of the crankshaft 20. The control device 11 calculates the engine rotational speed, which is the number of rotations of the crankshaft 20 per minute, based on the crank angle. The coolant temperature sensor 25 is a sensor that detects the temperature of the coolant of the internal combustion engine 10. The oil temperature sensor 26 is a sensor that detects an oil temperature that is a temperature of the lubricating oil of the internal combustion engine 10. The control device 11 controls the fuel injection amount and the fuel injection timing of the in-cylinder injector 17, the ignition timing of the ignition device 18, the throttle opening degree, and the like based on the detection results of these sensors.

The vehicle is provided with an ignition switch 27 for switching between a driving power mode in which the internal combustion engine 10 is operated and a parking power mode in which the internal combustion engine 10 is not operated. The switching from the power supply mode for parking to the power supply mode for traveling is performed in response to the switching from off to on of the ignition switch 27. The switching from the power supply mode for traveling to the power supply mode for parking is performed after the switching from ON to OFF of the ignition switch 27 is completed. The switching process is, for example, a process for stopping the internal combustion engine 10.

Processing Executed by the Control Device 11

Processing executed by the control device 11 will be described with reference to FIG. 2 to FIG. 4.

Figure 2:
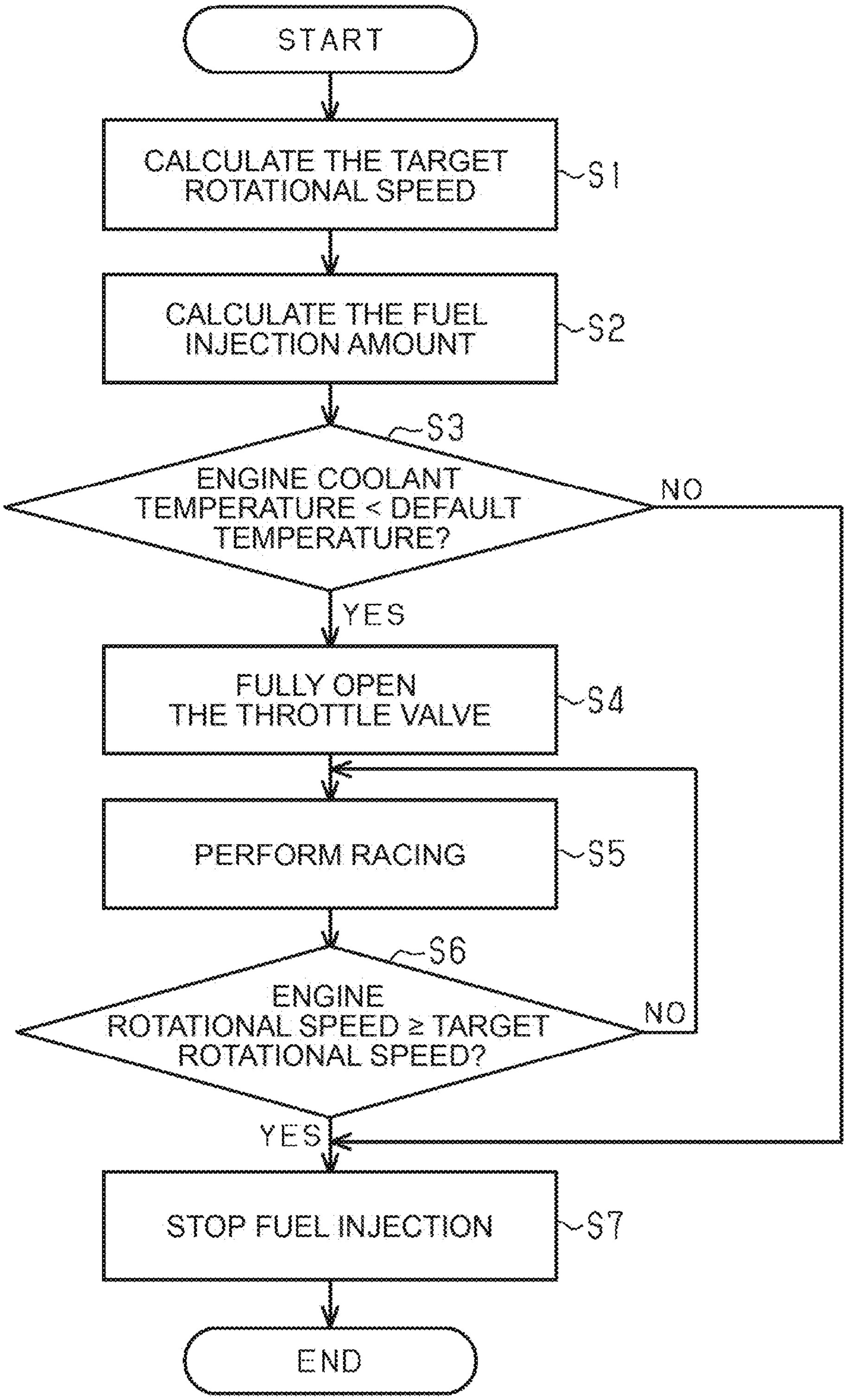
FIG. 2 is a flowchart illustrating a flow of processing executed when the control device of the internal combustion engine of FIG. 1 detects a shutdown request of the internal combustion engine.

The process of FIG. 2 is a process in which the control device 11 performs scavenging of the internal combustion engine 10. The control device 11 executes the process of FIG. 2 when a shutdown request for the internal combustion engine 10 is detected. The shutdown request of the internal combustion engine 10 is output, for example, when the driver switches the ignition switch 27 from on to off.

As shown in FIG. 2, when the control device 11 detects a shutdown request for the internal combustion engine 10, it first executes a S1 process. In S1, the control device 11 calculates a target rotational speed of the crankshaft 20. Specifically, the control device 11 calculates the target rotational speed based on the shutdown coolant temperature and the startup coolant temperature. The shutdown coolant temperature is the temperature of the engine coolant when the control device 11 detects the shutdown request. The startup coolant temperature is the temperature of the engine coolant when the internal combustion engine 10 is started. The control device 11 stores the startup coolant temperature when the internal combustion engine 10 is started.

In the control device 11, map data for calculating the target rotational speed based on the shutdown coolant temperature and the startup coolant temperature is stored in advance. The control device 11 calculates the target rotational speed based on the shutdown coolant temperature and the startup coolant temperature using the map data.

Figure 3:
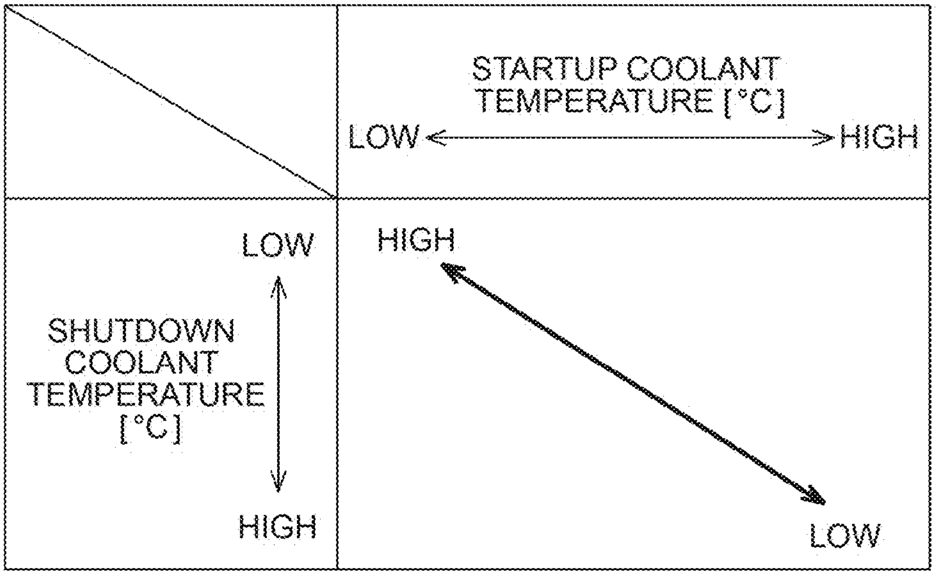
FIG. 3 is an exemplary explanatory diagram for describing the content of map data for calculating a target rotational speed [rpm]

As shown in FIG. 3, the map data is designed so that the calculated target rotational speed increases when the shutdown coolant temperature is lower than when the shutdown coolant temperature is higher. Moreover, the map data is designed such that the calculated target rotational speed increases when the startup coolant temperature is lower than when the startup coolant temperature is higher.

After calculating the target rotational speed, the control device 11 advances the process to S2 as shown in FIG. 2. In S2, the control device 11 calculates the fuel injection quantity in the racing described later. Specifically, the control device 11 calculates the fuel injection amount based on the current engine rotational speed and the oil temperature. The oil temperature is the oil temperature detected by the oil temperature sensor 26. That is, the oil temperature indicates the temperature of the lubricating oil of the internal combustion engine 10. The engine rotational speed is an engine rotational speed at the time of executing S2 process.

In the control device 11, map data for calculating the fuel injection amount in the racing based on the engine rotational speed and the oil temperature is stored in advance. In S2 process, the control device 11 uses the map data to calculate the fuel injection amount in the racing based on the engine rotational speed and the oil temperature at that time.

Figure 4:
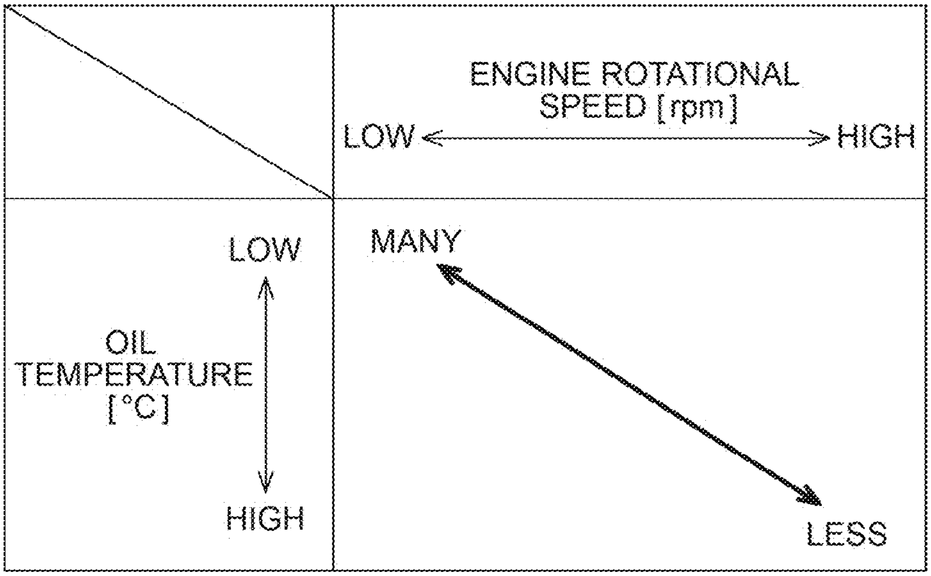
FIG. 4 is an exemplary explanatory diagram for describing the content of the map data for calculating the fuel injection quantity [mg/st]

As shown in FIG. 4, the map data is designed so that the calculated fuel injection amount increases when the engine rotational speed is lower than when the engine rotational speed is higher. Moreover, the map data is designed so that the calculated fuel injection amount increases when the oil temperature is lower than when the oil temperature is higher.

After calculating the fuel injection quantity, the control device 11 advances the process to S3.

In S3, the control device 11 determines whether or not the engine coolant temperature is lower than a predetermined temperature. The predetermined temperature is set based on the dew point temperature so that it can be determined that no moisture is attached to the inner wall of the cylinder 12 based on the fact that the engine coolant temperature is equal to or higher than the predetermined temperature. For example, the predetermined temperature is set to a temperature higher than the dew point temperature.

When the engine coolant temperature is equal to or higher than the predetermined temperature (S3: NO), the control device 11 advances the process to S7 without executing racing. In S7, the control device 11 terminates the series of processes by stopping the fuel injection. When the fuel injection is stopped, the internal combustion engine 10 is then stopped.

On the other hand, when the engine coolant temperature is lower than the predetermined temperature (S3: YES), the control device 11 advances the process to S4. In S4, the control device 11 fully opens the throttle valve 19. When the throttle valve 19 is fully opened, the control device 11 advances the process to S5.

In S5, the control device 11 executes racing. The racing means that the internal combustion engine 10 is emptied. Specifically, the control device 11 continuously performs the racing of the fuel injection quantity calculated in S2 while the throttle is fully opened.

When racing is started in S5, the control device 11 advances the process to S6.

In S6, the control device 11 determines whether or not the engine rotational speed is equal to or higher than the target rotational speed.

When the engine rotational speed is less than the target rotational speed (S6: NO), the control device 11 returns the process to S5. Thus, the control device 11 continues racing until the engine rotational speed reaches the target rotational speed.

On the other hand, when the engine rotational speed reaches the target rotational speed (S6: YES), the control device 11 advances the process to S7. In S7, the control device 11 stops the fuel injection. As a result, the racing ends. At this time, the throttle valve 19 remains fully opened. Since the fuel injection is stopped, the engine rotational speed gradually decreases, and the internal combustion engine 10 stops. When the internal combustion engine 10 is stopped, the power supply mode is switched to the parking mode, and no electric power is supplied, so that the throttle valve 19 is fully closed.

Operation of this Embodiment

Figure 5:
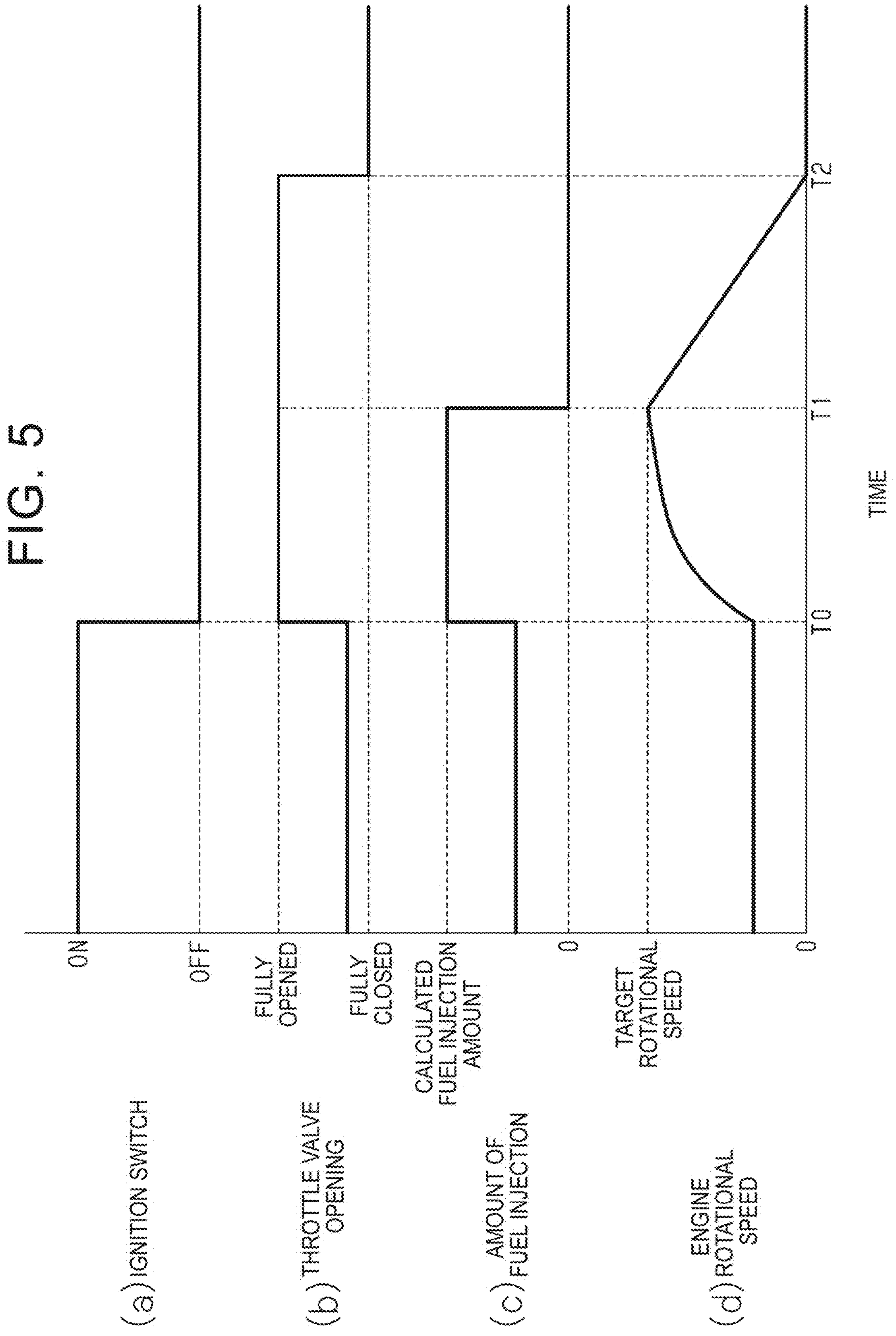
FIG. 5 is a time chart when the control device of the internal combustion engine of FIG. 1 detects a shutdown request of the internal combustion engine, wherein a portion (a) indicates a state of an ignition switch, a portion (b) indicates a throttle valve opening degree, a portion (c) indicates a fuel injection amount, and a portion (d) indicates a transition of an engine rotational speed.

As shown in part (a) of FIG. 5, when the ignition switch 27 is switched from on to off at the time TO, a shutdown request is outputted. The control device 11 detects the shutdown request and starts a series of processes described with reference to FIG. 2. Then, as shown in portions (b) and (c) of FIG. 5, the control device 11 continues to inject the fuel with the calculated fuel injection amount and executes racing while the throttle valve 19 is fully opened.

As shown in the portion (d) of FIG. 5, when the control device 11 executes racing, the engine rotational speed increases. When the engine rotational speed reaches the target rotational speed in the time T1, the control device 11 stops the fuel injection as illustrated in part (c) of FIG. 5. As shown in part (d) of FIG. 5, when the fuel injection is stopped at the time T1, the engine rotational speed gradually decreases. In the time T2, when the internal combustion engine 10 is stopped, the throttle valve 19 is fully closed as shown in part (b) of FIG. 5.

When the engine coolant temperature is low, the temperature of the inner wall of the cylinder 12 becomes low, so that the amount of moisture generated on the inner wall of the cylinder 12 by the combustion of the hydrogen gas increases. That is, the amount of moisture that needs to be blown off by scavenging increases. Therefore, when the shutdown request is detected, the control device 11 calculates the target rotational speed such that the target rotational speed increases as the engine coolant temperature decreases.

Then, the control device 11 continues the fuel injection and executes the racing until the engine rotational speed reaches the target rotational speed in a state where the throttle valve 19 is fully opened. This reduces the air resistance acting on the fresh air introduced into the combustion chamber 16. As a result, air is easily introduced into the combustion chamber 16, so that the output shaft of the internal combustion engine 10 can be easily rotated. Therefore, the amount of fuel required to reach the target rotational speed can be reduced. In addition, the time required for rotating the output shaft of the internal combustion engine 10 can be shortened.

Further, the control device 11 stops the fuel injection in a state where the throttle valve 19 is fully opened when the engine rotational speed reaches the target rotational speed. Then, the output shaft of the internal combustion engine 10 rotates due to inertia based on the engine rotational speed at the time of stopping the fuel injection. At this time, since the throttle valve 19 is fully opened, fresh air is introduced into the combustion chamber 16, so that the inside of the cylinder 12 is scavenged.

Effect of this Embodiment (1) The control device 11 increases the engine rotational speed higher as the engine coolant temperature is low and the amount of moisture that needs to be blown off by scavenging is estimated to be large, and then stops the fuel injection. Also, the throttle valve 19 is fully opened during racing and subsequent scavenging. As a result, moisture generated on the inner wall of the cylinder 12 can be blown off, and thus the occurrence of misfire can be suppressed.

(2) When a shutdown request is detected, the control device 11 stops fuel injection without executing racing when the engine coolant temperature is equal to or higher than a predetermined temperature set based on the dew point temperature. When the engine coolant temperature is equal to or higher than the predetermined temperature set based on the dew point temperature, the temperature of the inner wall in the cylinder 12 is also equal to or higher than the predetermined temperature. At this time, even if the hydrogen gas is burned, since the temperature of the inner wall of the cylinder 12 is high, no moisture is generated on the inner wall of the cylinder 12. Therefore, when the engine coolant temperature is equal to or higher than the predetermined temperature, unnecessary scavenging can be suppressed by stopping the fuel injection without executing racing.

(3) As shown in FIG. 3, the control device 11 calculates the target rotational speed based on the shutdown coolant temperature and the startup coolant temperature so that the target rotational speed increases when the startup coolant temperature is lower than when the startup coolant temperature, which is the engine coolant temperature at the startup of the internal combustion engine 10, is higher. Not only the shutdown coolant temperature but also the startup coolant temperature affects the temperature of the inner wall in the cylinder 12. That is, when the startup coolant temperature is low, the temperature of the inner wall of the cylinder 12 is also low. Therefore, even when the startup coolant temperature is low, the amount of moisture generated on the inner wall of the cylinder 12 by the combustion of the hydrogen gas increases. At this time, the scavenging function is enhanced by calculating the target rotational speed to be high. As a result, a large amount of moisture generated on the inner wall of the cylinder 12 can be blown off, and thus the occurrence of misfire can be suppressed.

(4) When the shutdown request is detected, the control device 11 calculates the fuel injection amount so that the fuel injection amount increases when the engine rotational speed is lower than when the engine rotational speed is higher, and executes racing. The higher the fuel injection amount, the higher the engine rotational speed per hour. When the engine rotational speed at the time of detecting the shutdown request is low, the difference from the target rotational speed becomes large. Therefore, by increasing the amount of increase in the engine rotational speed per hour, it is possible to shorten the time required for the engine rotational speed to reach the target rotational speed. Therefore, it is possible to shorten the time until completion of scavenging.

(5) As illustrated in FIG. 4, the control device 11 calculates the fuel injection amount so that the fuel injection amount increases when the oil temperature is lower than when the oil temperature is higher. When the oil temperature is low, since the viscosity of the engine oil is high, the amount of energy required increases until the engine rotational speed reaches the target rotational speed. In the above-described control device 11, when the oil temperature is low, the fuel injection amount is increased, and thus the energy supply amount per hour is increased. As a result, it is possible to shorten the time until the engine rotational speed reaches the target rotational speed. Therefore, it is possible to shorten the time until completion of scavenging.

Example of Change

The present embodiment can be modified and implemented as follows. The present embodiment and modification examples described below may be carried out in combination of each other within a technically consistent range.

The control device 11 may calculate the target rotational speed based on the engine coolant temperature so that the target rotational speed increases when the engine coolant temperature is lower than when the engine coolant temperature is higher when the shutdown request is detected. Although the control device 11 has shown an example of calculating the target rotational speed based on the shutdown coolant temperature and the startup coolant temperature, for example, the control device 11 may adopt a configuration that calculates the target rotational speed based only on the shutdown coolant temperature without referring to the startup coolant temperature.

An example has been described in which the control device 11 calculates the fuel injection amount in the racing based on the engine rotational speed and the oil temperature when the shutdown request is detected. On the other hand, a configuration in which the control device 11 calculates the fuel injection amount in the racing based on the engine rotational speed and the oil temperature is not essential. For example, a configuration may be adopted in which the control device 11 calculates the fuel injection amount in the racing based only on the engine rotational speed without referring to the oil temperature. For example, a configuration may be adopted in which the control device 11 calculates the fuel injection amount in the racing based only on the oil temperature without referring to the engine rotational speed. For example, a configuration may be adopted in which the control device 11 omits the process of calculating the fuel injection amount in the racing, and the control device 11 executes the racing by the fuel injection amount determined in advance at the time of design.

In the case where the engine coolant temperature is equal to or higher than the predetermined temperature, an example has been described in which the control device 11 stops the fuel injection without executing the racing and stops the internal combustion engine 10. On the other hand, without referring to the engine coolant temperature, a configuration may be adopted in which the control device 11 performs constant racing to perform scavenging and then stops the internal combustion engine 10.

The internal combustion engine 10 may be any internal combustion engine including the throttle valve 19. For example, the internal combustion engine 10 may be an internal combustion engine using gasoline as a fuel. For example, the internal combustion engine 10 may be an internal combustion engine using a mixed fuel obtained by mixing gasoline and alcohol fuel as a fuel. For example, the internal combustion engine 10 may be an internal combustion engine using hydrogen as a fuel. In particular, an internal combustion engine using hydrogen as a fuel generates water by burning hydrogen, and therefore, it is particularly effective to apply the control device 11 as described above.

The vehicle may be a vehicle in which only the internal combustion engine 10 is mounted as a driving force source. In addition to the internal combustion engine 10, the vehicles may be hybrid electric vehicle equipped with a motor as a driving force source. The vehicle may be an electrified vehicle in which the internal combustion engine 10 is mounted for power generation and only a motor is used as a driving force source.

What is claimed is:

1. A control device for an internal combustion engine using hydrogen gas as a fuel for lean combustion, in which a lean air-fuel mixture of which an air-fuel ratio is greater than a stoichiometric air-fuel ratio is combusted, the control device executing, when a shutdown request is detected, calculating a target rotational speed based on engine coolant temperature, such that the target rotational speed is greater when the engine coolant temperature is low than when the engine coolant temperature is high, executing racing, in which fuel injection is continued in a state in which a throttle valve is fully opened and an engine rotational speed is raised until the engine rotational speed reaches the target rotational speed, and scavenging inside of a cylinder of the internal combustion engine, by allowing an output shaft of the internal combustion engine to rotate under inertia in a state in which the fuel injection is stopped and the throttle valve is fully opened, when the engine rotational speed reaches the target rotational speed.

2. The control device according to claim 1, wherein, when the engine coolant temperature when the shutdown request is detected is no lower than a predetermined temperature that is set based on a dew point temperature, fuel injection is stopped without executing the racing.

3. The control device according to claim 1, wherein the target rotational speed is calculated based on a shutdown coolant temperature that is the engine coolant temperature when the shutdown request is detected, and a startup coolant temperature that is the engine coolant temperature at time of startup of the internal combustion engine, such that the target rotational speed is greater when the startup coolant temperature is low than when the startup coolant temperature is high.

4. The control device according to claim 1, wherein, when the shutdown request is detected, a fuel injection amount is calculated such that the fuel injection amount is greater when the engine rotational speed is low than when the engine rotational speed is high, and the racing is executed by this fuel injection amount.

5. The control device according to claim 4, wherein the fuel injection amount is calculated such that the fuel injection amount is greater when an oil temperature is low than when the oil temperature is high.

* * * * *